INVENTORS
CARL R. CORSON
LAWRENCE H. GILLIGAN
BY
ATTORNEY
AGENT

3,078,454
SYSTEM FOR AUTOMATIC CONTROL OF A PPI DISPLAY FOR OPTIMUM PHOTOGRAPHY

Carl R. Corson, Canoga Park, Calif., and Lawrence H. Gilligan, Nashua, N.H., assignors to the United States of America as represented by the Secretary of the Air Force
Filed July 12, 1960, Ser. No. 42,451
10 Claims. (Cl. 343—5)

The invention relates to a system for determining an indication of brightness to which a photographic film would be exposed and adjusting this brightness to a level suitable for proper film exposure.

When radar photographs are obtained for reconnaissance or training purposes, it is important that the photographs portray all picture details that were contained in the original radar display. Since the radar operator is usually concerned with other objectives, such as navigation and bombing, very little time and effort is spent in adjusting the camera or display for proper film exposure. This invention provides two methods for automatically obtaining optimum recording of the radar display.

In order to automatically control the display for photographic purposes, the strongest signal of any given PPI scan must be placed at a predetermined position on the film sensitivity curve. Therefore, some form of video information, such as kinescope beam current or the video driving voltage, must be peak detected, and the peak value for each PPI scanned must be stored until readout and used to adjust the light level reaching the film. This voltage is then stored during the period that its controlling influence is desired, and the control device is thereby constantly presented with a D.C. analogue of the peak signal from the previous scan.

The novel system is inherently advantageous over prior art systems. The system requires no external sensing device, such as a photo tube, and therefore is more compact, less cumbersome, and more reliable than systems used in the prior art.

There are two automatic control devices specifically contemplated and described. One is an automatic gain control device which adjusts the amplitude of the video drive such that the largest signal input to the kinescope causes a predetermined brightness to occur. This device has the advantage of providing instantaneous adjustment. The second control device contemplated is a variable density filter device which adjusts the percentage of total light output from the kinescope that is permitted to reach the film. This device has the advantage of compensating for the aging of the system up to and including the electron gun of the kinescope.

The invention can be used in any application where it is desired to obtain optimum photography from an unattended indicator. Typical uses for the system are for radarscope photography and reproduction of a single television frame for publicity purposes.

It is an object of this invention to provide a system for automatic control of a PPI radar display without requiring an external sensing device.

It is another object of this invention to provide a system which determines an indication of the peak brightness to which the film would be exposel and adjust this brightness to a level suitable for the proper film exposure.

It is specifically an object of this invention to provide a system which samples either the video driving voltage to the kinescope or the kinescope cathode current, determines the peak value during the PPI scan, and adjusts the system for the correct film exposure.

The nature of the invention, further objects and advantages will appear more fully by consideration of the embodiments illustrated from the accompanying drawings and hereinafter to be described.

Figure 1:
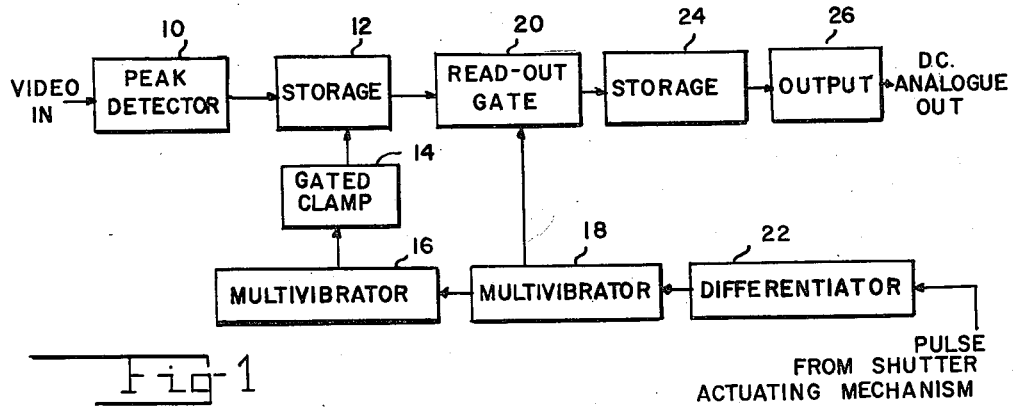
FIG. 1 is a block diagram of the system for detection and storage of the control signal.

Referring now more particularly to FIG. 1, there is illustrated the detection and storage portion of this invention. The incoming video of one PPI scan is operated upon by the peak detector 10. The function of the peak detector 10 is to feed the peak amplitude of the video signal into the storage circuit 12 where the signal is retained for the duration of the one PPI scan. The shutter mechanism of the camera which is to take the picture of the PPI display actuates a pulse that is fed to differentiator 22. As the shutter of the camera is closed, the pulse obtained from the actuation of the shutter mechanism is shaped by the differentiator 22 to provide a sharp leading edge and used to trigger multivibrator 18. The output pulse from the multivibrator 18 opens the readout gate 20 to transfer the peak video from the storage circuit 12 to storage circuit 24. The peak signal is retained in storage circuit 24 for the duration of the next PPI scan. The output circuit 26 operates on the stored information in storage circuit 24 to produce a D.C. analogue suitable for the control system which is used.

The trailing edge of the output of multivibrator 18 also triggers multivibrator 16. The output of multivibrator 16 clamps storage circuit 12 by means of a gated clamp 14 to remove all stored information in preparation for the next PPI scan.

The incoming video can be readily obtained from two sources, directly from the cathode of the kinescope or the video driving voltage to the kinescope. If the video information to be detected is taken directly from the kinescope, as a function of beam current, it will contain certain artifically produced signals, such as range rings, heading marker, and cross-hairs. In order that these wave forms are not detected as peak video, it will be necessary to cancel them with inverted artificial video before applying the incoming video to the peak detector 10.

Figure 2:
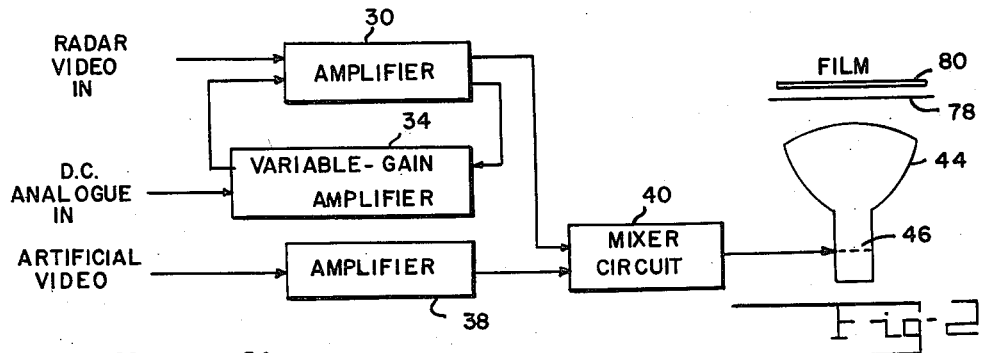
FIG. 2 is a block diagram for the automatic gain control system for automatic control.

The D.C. analogue in the automatic control system illustrated in FIG. 2 is applied to an automatic gain type circuit. This automatic gain circuit is in its simplest form composed of a main amplifier 30 having a feedback path and a variable-gain feedback amplifier 34 in the feedback path. The radar video signal is applied to the main amplifier 30. The action of the feedback variable-gain amplifier in this circuit is two-fold. It acts as an automatic gain control circuit wherein the output of the main amplifier 30 is maintained constant within narrow limits regardless of variations in the video signal strength. Further, through the action of the D.C. analogue output, which acts to vary the total gain in the feedback path, B, the variable gain amplifier 34 adjusts the amplitude of the video drive such that the largest signal input to the kinescope causes a predetermined brightness to occur. Since the desired gain in amplifier 30 is inversely proportional to the peak video signal, the $1/B$ characteristic of the feedback amplifier 34 is utilized to provide the desired function.

A mixer circuit 40 is provided to combine the amplified radar video from the main amplifier 30 and amplified artificial video from amplifier 38. The artificial video, such as range rings, heading marker, and cross-hairs must be separately amplified to a fixed level by amplifier 38.

The intensity of the scanning ray of the kinescope or image reproducing device 44 is thus modulated or controlled in accordance with the video-frequency voltages derived from mixer 40 and impressed upon the control grid 46 in the usual manner.

Figure 3:
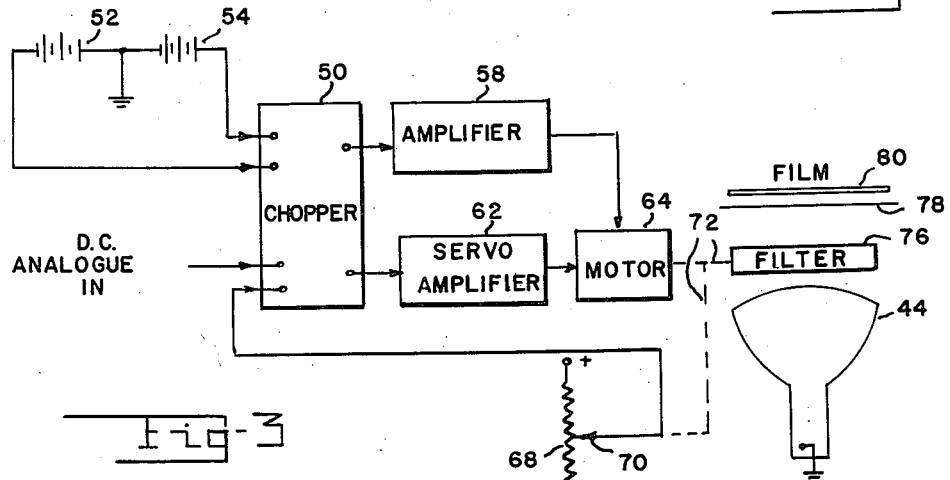
FIG. 3 is a block diagram of the variable density filter type of automatic control.

FIG. 3 shows a block diagram of the variable density filter type of automatic control which adjusts the percentage of the total light output from the kinescope 44 that is permitted to reach the film 80. The camera's shutter mechanism is indicated schematically at 78. The variable density filter 76 is mechanically linked through linkage 72 to servo motor 64. The servo motor is energized by voltage from batteries 52 and 54, and the voltage applied through the chopper 50 and the amplifier 58 to the motor. The D.C. analogue voltage output of the detector and storage circuit is fed into chopper 50 and compared with the D.C. voltage from the movable arm 70 of the potentiometer 68. The movable arm 70 is mechanically connected to servo motor 64. Any difference in amplitude between the two D.C. voltages appears as a square wave at the output of chopper 50. This error signal is amplified in the servo amplifier 62 and used to drive the motor 64. The motor drives the variable density filter 76 and the potentiometer arm 70 in the direction such as to reduce the error signal to the point where no error exists.

It is desirable to monitor the kinescope cathode current for the variable density type of control and use this video signal to feed the detector and storage circuit, since the light output from the face of the kinescope is directly proportional to the ultor current (until blooming of the phosphorous occurs). In kinescopes that utilize a "zero screen current" electron gun, the ultor current and the cathode current are nearly identical. Monitoring the kinescope cathode current, as indicated above in the discussion of the detector and storage circuit, requires cancelling the artificial video before the peak detection process occurs. In addition to this it is necessary to control the amplitude of the artificial video drive to the kinescope as the target video varies in amplitude. If this is not done, the artificial video will be saturating the film when small amplitude target video is being compensated for by reducing the density of the filter between the kinescope and the camera.

While the invention has been described with reference in part to a PPI type of image-reproducing device, the invention is not intended to be limited thereto. The system is not limited to the examples of embodiments shown and described, but may on the contrary, be capable of many modifications, without departing from the spirit of the invention.

We claim:

1. In an apparatus for automatic control of a PPI radar display on a kinescope for optimum photography, the combination comprising: a source of video information from a first PPI scan, means for peak detecting the peak amplitude of said video coupled to said source, a first means for storing said peak amplitude information detected by said means for peak detecting, a second means for storing said peak amplitude information for the duration of the next PPI scan, means for transferring the said peak amplitude information from said first means for storing to said second means for storing, means for removing said peak amplitude information from said first storage means in preparation for the said next PPI scan, an output circuit for operating on said information in said second storage means to produce a D.C. analogue of said peak amplitude information, means for adjusting light output from the said kinescope that is permitted to reach the photographic film, and means for applying said D.C. analogue to said means for adjusting for controlling same.

2. A system for automatic control of a radar display for optimum photography comprising: a kinescope, means for peak amplitude detecting, means for monitoring video information to said kinescope and supplying the said video information to said means for peak detecting, a first means for storing said peak amplitude information detected by said means for peak detecting, a second means for storing said peak amplitude information for a predetermined time, means for transferring the said peak amplitude information from said first means for storing to said second means for storing, means for removing said peak amplitude information from said first storage means, an output circuit for operating on said information in said second storage means to produce a D.C. analogue of said peak amplitude information, means for adjusting light output from the said kinescope that is permitted to reach the photographic film, and means for applying said D.C. analogue to said means for adjusting for controlling same.

3. In an apparatus for automatic control of a PPI radar display on a kinescope for optimum photography with a shutter operated camera, the combination comprising: a source of video information from a first PPI scan, means for peak detecting the peak amplitude of said video coupled to said source, a first means for storing said peak amplitude information detected by said means for peak detecting, a second means for storing said peak amplitude information for the duration of the next PPI scan, a differentiator for shaping pulses to provide sharp leading edges thereon, means for applying a pulse to the said differentiator when the shutter mechanism of the said camera closes, a multivibrator coupled to said differentiator, a readout gate connected between said first and second means for storage, said multivibrator applying a gating pulse to said readout gate when said multivibrator is triggered by a sharp leading edged pulse from said differentiator, means for removing said peak amplitude information from said first storage means in preparation for the said next PPI scan, an output circuit for operating on said information in said second storage means to produce a D.C. analogue of said peak amplitude information, means for adjusting light output from the said kinescope that is permitted to reach the photographic film, and means for applying said D.C. analogue to said means for adjusting for controlling same.

4. A system for automatic control of a radar display for optimum photography with a shutter operated camera comprising: a kinescope, means for peak amplitude detecting, means for monitoring video information to said kinescope and supplying the said video information to said means for detecting, a first means for storing said peak amplitude information detected by said means for peak detecting, a second means for storing said peak amplitude information for a predetermined time, a differentiator for shaping pulses to provide sharp leading edges thereon, means for applying a pulse to the said differentiator when the shutter mechanism of the said camera closes, a multivibrator coupled to said differentiator, a readout gate connected between said first and second means for storage, said multivibrator applying a gating pulse to said readout gate when said multivibrator is triggered by a sharp leading edged pulse from said differentiator, means for removing said peak amplitude information from said first storage means, an output circuit for operating on said information in said second storage means to produce a D.C. analogue of said peak amplitude information, means for adjusting light output from the said kinescope that is permitted to reach the photographic film, and means for applying said D.C. analogue to said means for adjusting for controlling same.

5. In an apparatus for automatic control of a PPI radar display on a kinescope for optimum photography, the combination comprising: a source of video information from a first PPI scan, means for peak detecting the peak amplitude of said video coupled to said source, a first means for storing said peak amplitude information detected by said means for peak detecting, a second means for storing said peak amplitude information for the duration of the next PPI scan, means for transferring the said peak amplitude information from said first means for storing to said second means for storing, means for removing said peak amplitude information from said first storage means in preparation for the said next PPI scan, an output circuit for operating on said information in said second storage means to produce a D.C. analogue of said peak amplitude information, a source of radar video, a main amplifier having a feedback path, a variable gain amplifier in said feedback path, means for applying said radar video to the input of said main amplifier, means for applying said D.C. analogue to said variable gain amplifier, and means for impressing the output of said main amplifier on the intensity control grid of said kinescope.

6. A system for automatic control of a radar display for optimum photography with a shutter operated camera comprising: a kinescope, means for peak amplitude detecting, means for monitoring video information to said kinescope and supplying the said video information to said means for detecting, a first means for storing said peak amplitude information detected by said means for peak detecting, a second means for storing said peak amplitude information for a predetermined time, a differentiator for shaping pulses to provide sharp leading edges thereon, means for applying a pulse to the said differentiator when the shutter mechanism of the said camera closes, a multivibrator coupled to said differentiator, a readout gate connected between said first and second means for storage, said multivibrator applying a gating pulse to said readout gate when said multivibrator is triggered by a sharp leading edged pulse from said differentiator, means for removing said peak amplitude information from said first storage means, an output circuit for operating on said information in said second storage means to produce a D.C. analogue of said peak amplitude information, a source of radar video, a main amplifier having a feedback path, a variable gain amplifier in said feedback path, means for applying said radar video to the input of said main amplifier, means for applying said D.C. analogue to said variable gain amplifier, and means for impressing the output of said main amplifier on the intensity control grid of said kinescope.

7. In an apparatus for automatic control of a PPI radar display on a kinescope for optimum photography with a shutter operated camera, the combination comprising: a source of video information from a first PPI scan, means for peak detecting the peak amplitude of said video coupled to said source, a first means for storing said peak amplitude information detected by said means for peak detecting, a second means for storing said peak amplitude information for the duration of the next PPI scan, a differentiator for shaping pulses to provide sharp leading edges thereon, means for applying a pulse to the said differentiator when the shutter mechanism of the said camera closes, a multivibrator coupled to said differentiator, a readout gate connected between said first and second means for storage, said multivibrator applying a gating pulse to said readout gate when said multivibrator is triggered by a sharp leading edged pulse from said differentiator, means for removing said peak amplitude information from said first storage means in preparation for the said next PPI scan, an output circuit for operating on said information in said second storage means to produce a D.C. analogue of said peak amplitude information, a source of radar video, a main amplifier having a feedback path, a variable gain amplifier in said feedback path, means for applying said radar video to the input of said main amplifier, means for applying said D.C. analogue to said variable gain amplifier, a source of artificial video, an amplifier coupled to the said source of artificial video for amplifying said artificial video to a fixed level, a mixer circuit, means for applying the outputs of said main amplifier and said artificial video amplifier to said mixer circuit, and means for impressing the output of said mixer circuit on the intensity control grid of said kinescope.

8. A system for automatic control of a radar display for optimum photography comprising: a kinescope, means for peak amplitude detecting, means for monitoring video information to said kinescope and supplying the said video information to said means for detecting, a first means for storing said peak amplitude information detected by said means for peak detecting, a second means for storing said peak amplitude information for a predetermined time, means for transferring the said peak amplitude information from said first means for storing to said second means for storing, means for removing said peak amplitude information from said first storage means, an output circuit for operating on said information in said second storage means to produce a D.C. analogue of said peak amplitude information, a source of radar video, a main amplifier having a feedback path, a variable gain amplifier in said feedback path, means for applying said radar video to the input of said main amplifier, means for applying said D.C. analogue to said variable gain amplifier, a source of artificial video, an amplifier coupled to the said source of artificial video for amplifying said artificial video to a fixed level, a mixer circuit, means for applying the outputs of said main amplifier and said artificial video amplifier to said mixer circuit, and means for impressing the output of said mixer circuit on the intensity control grid of said kinescope.

9. A system for automatic control of a radar display for optimum photography comprising: a kinescope, means for peak amplitude detecting, means for monitoring video information to said kinescope and supplying the said video information to said means for detecting, a first means for storing said peak amplitude information detected by said means for peak detecting, a second means for storing said peak amplitude information for a predetermined time, means for transferring the said peak amplitude information from said first means for storing to said second means for storing, means for removing said peak amplitude information from said first storage means, an output circuit for operating on said information in said second storage means to produce a D.C. analogue of said peak amplitude information, a chopper means having first and second terminals for comparing D.C. voltages and producing an error signal when said voltages are unequal, a potentiometer, means for applying the said D.C. analogue to said first terminal of said chopper means, means for applying the voltage at the arm of said potentiometer to said second terminal of said chopper means, a variable density filter placed in front of the screen of the said kinescope, means responsive to said error signal for driving said filter and said potentiometer in the direction such as to reduce the said error signal.

10. In an apparatus for automatic control of a PPI radar display on a kinescope for optimum photography with a shutter operated camera, the combination comprising: a source of video information from a first PPI scan, means for peak detecting the peak amplitude of said video coupled to said source, a first means for storing said peak amplitude information detected by said means for peak detecting, a second means for storing said peak amplitude information for the duration of the next PPI scan, a differentiator for shaping pulses to provide sharp leading edges thereon, means for applying a pulse to the said differentiator when the shutter mechanism of the said camera closes, a multivibrator coupled to said differentiator, a readout gate connected between said first and second means for storage, said multivibrator applying a gating pulse to said readout gate when said multivibrator is triggered by a sharp leading edged pulse from said differentiator, means for removing said peak amplitude information from said first storage means in preparation for the said next PPI scan, an output circuit for operating on said information in said second storage means to produce a D.C. analogue of said peak amplitude information, a chopper means having first and second terminals for comparing D.C. voltages and producing an error signal when said voltages are unequal, a potentiometer, means for applying the said D.C. analogue to said first terminal of said chopper means, means for applying the voltage at the arm of said potentiometer to said second terminal of said chopper means, a variable density filter placed in front of the screen of the said kinescope, means responsive to said error signal for driving said filter and said potentiometer in the direction such as to reduce the said error signal.

No references cited.